(12) United States Patent
Kurosawa

(10) Patent No.: US 9,189,877 B2
(45) Date of Patent: Nov. 17, 2015

(54) PIXEL ANALYSIS AND IMAGE TRANSFORMATION DEVICE AND METHOD

(71) Applicant: HITACHI SOLUTIONS, LTD., Tokyo (JP)

(72) Inventor: Akira Kurosawa, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 0 days.

(21) Appl. No.: 14/366,071

(22) PCT Filed: Jan. 8, 2013

(86) PCT No.: PCT/JP2013/050087
§ 371 (c)(1),
(2) Date: Jun. 17, 2014

(87) PCT Pub. No.: WO2013/140824
PCT Pub. Date: Sep. 26, 2013

(65) Prior Publication Data
US 2014/0355887 A1 Dec. 4, 2014

(30) Foreign Application Priority Data

Mar. 22, 2012 (JP) .................................. 2012-066198

(51) Int. Cl.
| | |
|---|---|
| *G06K 9/36* | (2006.01) |
| *G06T 11/60* | (2006.01) |
| *G06T 7/00* | (2006.01) |
| *G06T 11/40* | (2006.01) |
| *G06K 9/46* | (2006.01) |

(52) U.S. Cl.
CPC .............. *G06T 11/60* (2013.01); *G06K 9/4604* (2013.01); *G06T 7/0083* (2013.01); *G06T 7/0085* (2013.01); *G06T 7/0095* (2013.01); *G06T 11/40* (2013.01); *G06K 2009/4666* (2013.01); *G06T 2207/20064* (2013.01)

(58) Field of Classification Search
None
See application file for complete search history.

(56) References Cited

U.S. PATENT DOCUMENTS

| | | | | |
|---|---|---|---|---|
| 5,687,258 | A | * | 11/1997 | Kaplan .......................... 382/268 |
| 6,078,694 | A | * | 6/2000 | Takahashi et al. ............. 382/238 |
| 6,704,440 | B1 | * | 3/2004 | Kump ........................... 382/132 |

FOREIGN PATENT DOCUMENTS

| | | |
|---|---|---|
| JP | 2002-336239 A | 11/2002 |
| JP | 2006-229895 A | 8/2006 |
| JP | 2009-025894 A | 2/2009 |

OTHER PUBLICATIONS

Youg Du et al., Haze Detection and Removal in High Resolution Satellite Image With Wavelet Analysis, Geoscience and Remote Sensing, IEEE Transactions on Jan 2002, p. 210-217, vol. 40 Issue: 1.

* cited by examiner

*Primary Examiner* — Brian P Werner
(74) *Attorney, Agent, or Firm* — Mattingly & Malur, PC

(57) ABSTRACT

Provided is an image processing device including a corresponding pixel computation unit configured to, with respect to image data containing an image data area and an ignored area, replace a pixel in the ignored area having influence on a spatial analysis process with a pixel having no influence on the spatial analysis process.

9 Claims, 10 Drawing Sheets

Image Data 101

Image Data Range 102   Ignored Area 103

Fig. 7

| Pixel ID | x | y | Pixel Value for Band 0 | Pixel Value for Band 1 | Pixel Value for Band 2 | Pixel Value for Band 3 | ... | Pixel Value for Band N-1 |
|---|---|---|---|---|---|---|---|---|
| 0 | 0 | 0 | 0 | 0 | 0 | 0 | ... | 0 |
| 1 | 1 | 0 | 37 | 127 | 226 | 53 | ... | 109 |
| 2 | 2 | 0 | 61 | 77 | 2 | 8 | ... | 112 |
| ... | ... | ... | ... | ... | ... | ... | ... | ... |
| L × M-1 | L-1 | M-1 | 0 | 0 | 0 | 0 | ... | 0 |

| List ID | x | y | Pixel ID |
|---|---|---|---|
| 0 | 2 | 0 | 2 |
| 1 | 5 | 0 | 5 |
| 2 | 1 | 1 | 9 |
| ... | ... | ... | ... |
| E-1 | 4 | 7 | 60 |

801 802 803 804

PIXEL ANALYSIS AND IMAGE TRANSFORMATION DEVICE AND METHOD

TECHNICAL FIELD

The present invention relates to an image analysis technology that uses a spatial transformation.

BACKGROUND ART

Nowadays, high-resolution satellite images and aerial photographs have become more commonly used to quickly figure out a wide devastated area in which disasters such as floods or earthquakes have occurred. Electronic data on such satellite images and aerial photographs include positional information that can be, when geometric correction is applied thereto, displayed in a manner overlaid on the existing map, whereby it becomes possible to exactly figure out and analyze the disaster situation. However, such analysis is dependent on the visual check of an expertise, which requires huge cost and time. Thus, there has been an increasing need for automation of the analysis or a method for assisting in the visual check.

As shown in FIG. 1, the cost of image data 101 on a satellite image or an aerial photograph depends on its area. Therefore, typically, an image data range 102 requested by a user is cut out and provided. Such image data range 102 often has an indefinite shape. Examples of the image data range 102 include ancient tombs.

Meanwhile, the format of a typical image file is defined such that the range of a square or a rectangle is stored. Thus, most of electronic data on satellite images and aerial photographs that are provided are not satisfied with the observed data. In many cases, the pixel value of an area that contains no image data is defined by a constant such as zero. Hereinafter, an area containing no image data will be referred to as an ignored area 103.

Among image analysis processes is a two-dimensional wavelet transformation. In the two-dimensional wavelet transformation, each of x components and y components is decomposed into high-frequency components and low-frequency components. FIG. 2 is a conceptual diagram for when a two-dimensional wavelet transformation is performed twice. High-frequency components of both x and y components that are orthogonal to the original image are indicated by HH1 (201), high-frequency components in the x direction of the original image and low-frequency components in the y direction of the original image are indicated by HL1 (202), low-frequency components in the x direction of the original image and high-frequency components in the y direction of the original image are indicated by LH1 (203), and there are also low-frequency components of both x and y components that are orthogonal the original image. Further, as a result of performing a two-dimensional wavelet transformation again on the low-frequency components of both the x and y components that are orthogonal to the original image, the low-frequency components of both the x and y components that are orthogonal to the original image are decomposed into high-frequency components of both the x and y components: HH2 (204); the high-frequency components of both the x and y components that are orthogonal to the original image are decomposed into low-frequency components in the x direction and low-frequency components in the y direction: HL2 (205); the low-frequency components of both the x and y components that are orthogonal to the original image are decomposed into low-frequency components in the x direction and high-frequency components in the y direction: LH2 (206); and the low-frequency components of both the x and y components that are orthogonal to the original image are decomposed into low-frequency components of both the x and y components: LL2 (207). Likewise, any hierarchical transformation can be performed as the two-dimensional wavelet transformation. Such characteristics of the two-dimensional wavelet transformation are used to perform statistical analysis on each scale, so as to be applied to extraction of an edge from an image, correction of the image quality, compression of image data, and the like.

Non Patent Literature 1 below is known technical literature related to the present invention.

CITATION LIST

Non Patent Literature

Non Patent Literature 1: Yong Du, Bert Guindon, and Josef Cihlar, Haze detection and removal in high resolution satellite image with wavelet analysis, Geoscience and Remote Sensing, IEEE Transactions on, January 2002, Volume 40 Issue: 1, p 210-217

SUMMARY OF INVENTION

Technical Problem

Non Patent Literature 1 relates to the removal of haze in a satellite image. According to Non Patent Literature 1, a satellite image containing haze is input and a two-dimensional wavelet transformation is applied thereto, so that a haze-free satellite image is output. At this time, it is necessary to use coefficients for determining an area of haze and performing image processing on the area of the haze. Coefficients that are necessary to determine an area of haze and perform image processing thereon can be implemented by performing statistical analysis on high-frequency components and low-frequency components at each hierarchy level of an image that has been subjected to a hierarchical two-dimensional wavelet transformation.

However, when an image containing an ignored area is processed, it would be impossible to perform the intended statistical analysis on the image due to the influence of pixel information on the ignored area. In Non Patent Literature 1, such ignored area is not taken into consideration, and thus, an image is partially cut out to be used such that it does not contain an ignored area. Thus, if the same process as that in Non Patent Literature 1 is performed on image data containing an ignored area, expected results would not be obtained since the image data contains the ignored area that is not the observed data.

Although the problem described with reference to Non Patent Literature 1 concerns a satellite image, such an analysis-related problem also occurs on a medical image such as an x-ray radiograph converted into electronic data. More specifically, when an x-ray radiograph is captured, if the x-ray irradiation range is narrowed to minimize the influence of an X-ray on the human body, an area that is not irradiated with the X-ray is generated. Therefore, the x-ray radiograph also contains an ignored area as with the satellite image.

In order to obtain expected results from image data containing an ignored area, if an analysis process is modified so that it does not take the ignored area into consideration, it becomes possible to ignore or reduce the influence of the ignored area, but the process would become complex, which in turn can make it difficult to perform system development and maintenance. As a method for avoiding complexity of the process, separating the process into a plurality of processes is considered. However, in order to separate a process, it would be necessary to consider common intermediate data for use in input/output in the separated process.

FIG. 3 is a transition diagram of image data at each process stage. An image (101) containing an ignored area is input, and analysis (302) in which the ignored area is taken into consideration is performed, whereby an expected resultant image (303) is obtained. However, the analysis (302) in which the ignored area is taken into consideration is complex, and thus, the maintenance is difficult to perform.

It is an object of the present invention to, when image data containing an ignored area is analyzed, avoid the ignored area from influencing the analysis, and avoid complexity of the process.

Solution to Problem

In the present invention, an image containing an ignored area is transformed into an intermediate image, which has no influence on analysis, through a pre-process. The intermediate image having no influence on analysis is subjected to analysis in which the ignored area is not taken into consideration, whereby an analyzed image for which the ignored area is not taken into consideration is obtained. Of the image containing the ignored area, only the ignored area is reflected into the intermediate image processing result, whereby an expected resultant image is obtained.

According to an aspect of the present invention, there is provided an image processing device including a corresponding pixel computation unit configured to, with respect to image data containing an image data area and an ignored area, replace a pixel in the ignored area having influence on a spatial analysis process with a pixel having no influence on the spatial analysis process.

Accordingly, an intermediate image processing result having no influence on analysis can be obtained. When a pre-process of replacing a pixel in the ignored area with a pixel computed by the corresponding pixel computation unit is performed, it becomes possible to reduce the influence of an edge when restoring an image, which has been obtained by applying a spatial analysis process to an image obtained by replacing the ignored area with alternate information, to the original ignored area.

The corresponding pixel computation unit preferably computes coordinates of an alternate pixel for each ignored pixel value and a value of the alternate pixel on the basis of a pixel in the image data area that is symmetrical with respect to an edge pixel at a boundary between the image data area and the ignored area.

The corresponding pixel computation unit preferably includes a shortest-distance edge pixel extraction unit configured to extract an edge pixel at a shortest distance from the ignored pixel; an another-endpoint pixel computation unit configured to, with respect to a line segment having the edge pixel as a midpoint and having the ignored pixel as an endpoint, a pixel at another endpoint; an ignored pixel determination unit configured to determine if the pixel at the other endpoint is an ignored pixel; and a pixel value overwriting unit configured to, if the pixel at the other endpoint is not an ignored pixel, write a pixel value of the pixel at the other endpoint over the pixel value of the ignored pixel.

Further, an image, which has been obtained by applying a spatial analysis process to an image obtained by replacing the ignored area with alternate information, is preferably restored to the original ignored area.

According to another aspect of the present invention, there is also provided an image processing method including a corresponding pixel computation step of, with respect to image data containing an image data area and an ignored area, replacing a pixel in the ignored area having influence on a spatial analysis process with a pixel having no influence on the spatial analysis process.

The corresponding pixel computation step preferably includes computing coordinates of an alternate pixel for each ignored pixel value and a value of the alternate pixel the basis of a pixel in the image data area that is symmetrical with respect to the edge.

The corresponding pixel computation step preferably includes a shortest-distance edge pixel extraction step of extracting an edge pixel at a shortest distance from the ignored pixel; an another-endpoint pixel computation step of computing, with respect to a line segment having the edge pixel as a midpoint and having the ignored pixel as an endpoint, a pixel at another endpoint; an ignored pixel determination step of determining if the pixel at the other endpoint is an ignored pixel; and a pixel value overwriting step of, if the pixel at the other endpoint is not an ignored pixel, writing a pixel value of the pixel at the other endpoint over the pixel value of the ignored pixel.

Further, an image, which has been obtained by applying a spatial analysis process to an image obtained by replacing the ignored area with alternate information, is preferably restored to the original ignored area.

Alternatively, the present invention may be a program for causing a computer to execute the aforementioned image processing method, or a computer-readable recording medium having the program recorded thereon.

Each component of the present invention may be either selected or not, and an invention obtained thereby is also included in the present invention.

The present specification contains the content described in the specification and/or drawings of the JP Patent Application No. 2012-066198 that serves as a basis for the priority claim of the present application.

Advantageous Effects of Invention

According to the present invention, the following advantageous effects are provided.

It is possible to, when image data containing an ignored area is analyzed, prevent the ignored area from influencing the analysis, and avoid complexity of the process.

BRIEF DESCRIPTION OF DRAWINGS

FIG. 4A is a functional block diagram showing an exemplary system configuration related to a process of replacing an ignored area with data having no influence on an analysis process that uses a two-dimensional wavelet transformation or the like.

FIG. 7 is a diagram showing an exemplary data structure of an image data array used for image processing in accordance with this embodiment.

FIG. 8 is a diagram showing an exemplary data structure of an edge pixel coordinate list.

DESCRIPTION OF EMBODIMENTS

In the present specification, an image data area (i.e., image data range) means an image area needed by a user, while an ignored area means an image area not needed by the user. For example, when it comes to a satellite image, an area needed by a purchaser is the image data area, and an area not needed by the purchaser is the ignored area.

Figure 1:
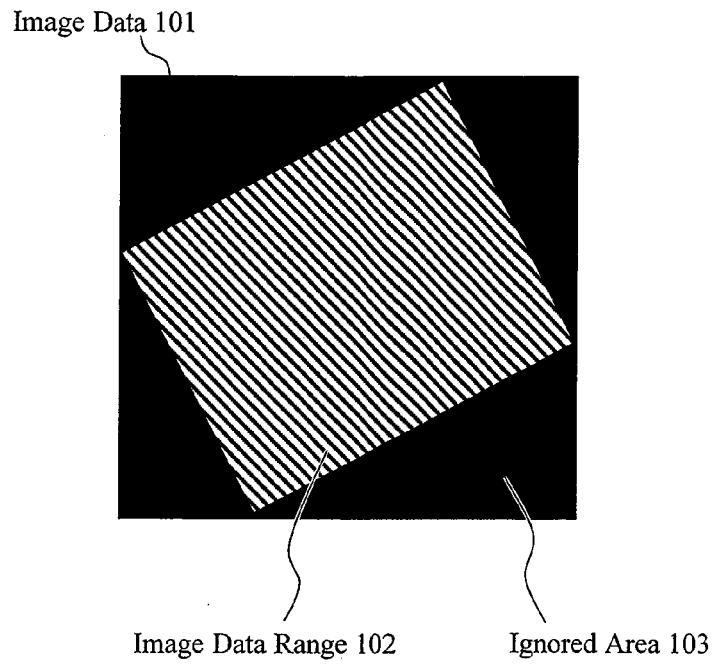
FIG. 1 is a diagram showing an example of image data used for image processing in accordance with an embodiment of the present invention.
Figure 2:
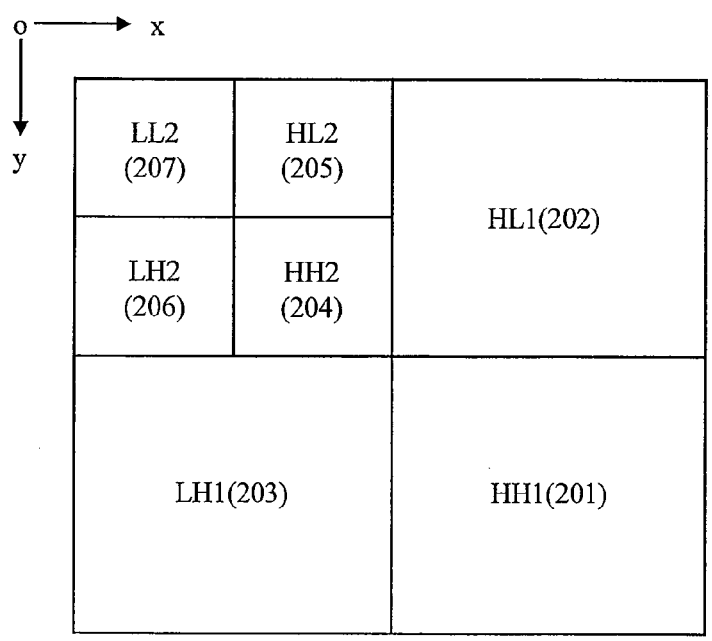
FIG. 2 is a conceptual diagram of a data structure obtained by performing a two-dimensional wavelet transformation on image data twice.
Figure 3:
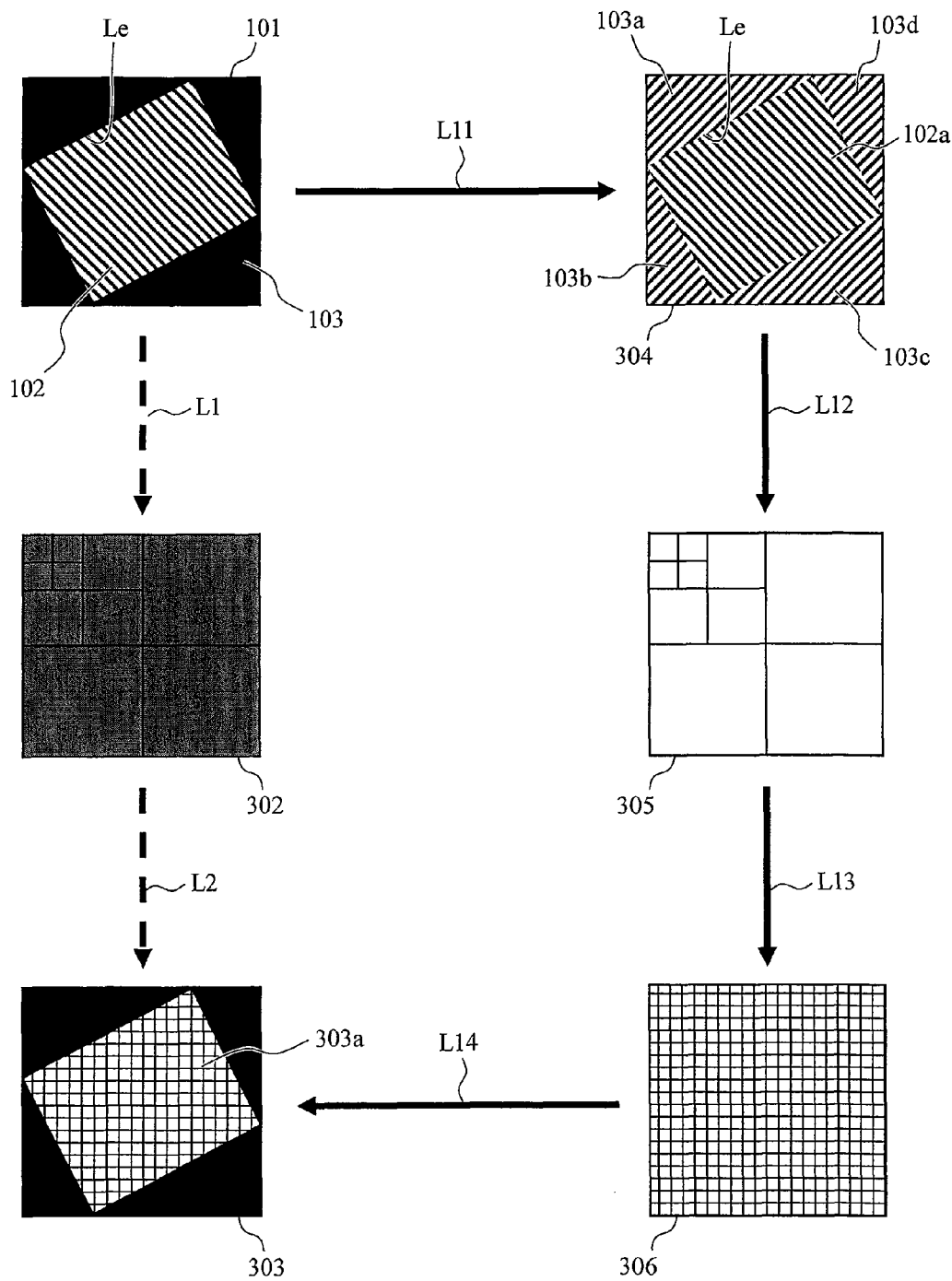
FIG. 3 is a transition diagram of image data showing the state of image processing in accordance with this embodiment.

Hereinafter, an image processing technology in accordance with an embodiment of the present invention will be described with reference to the drawings. FIGS. 1 and 2 are referred to as appropriate. FIG. 3 is a transition diagram of image data showing the state of transition of image processing in accordance with this embodiment. As shown in FIG. 3, typically, a two-dimensional wavelet transformation process L1, analysis (302) in which the ignored area is taken into consideration, and a two-dimensional wavelet inverse transformation process L2 are sequentially performed on the image data (101) containing the image data range (102) and the ignored area (103), using a program for performing a process by taking the ignored area into consideration, whereby the expected resultant image (303) is obtained.

Meanwhile, in this embodiment, the image (101) containing the ignored area is transformed into an intermediate image (304) having no influence on analysis, through a pre-process (L11). Next, the intermediate image (304) having no influence on analysis is sequentially subjected to a two-dimensional wavelet transformation process L12, analysis (305) in which the ignored area is not taken into consideration, and a two-dimensional wavelet inverse transformation process L13, using a program that performs a process by not taking the ignored area into consideration, whereby the intermediate image (304) is transformed into an intermediate image processing result (306) for which the ignored area is not taken into consideration. Finally, a process L14 of reflecting the ignored area in the image (101), which contains the ignored area, into the intermediate image processing result (306) for which the ignored area is not taken into consideration is performed, whereby the expected resultant image (303) is obtained. At this time, it is also important to remove the influence of an edge pixel Le between the image data range (102) and the ignored area (103).

Figure 4A:
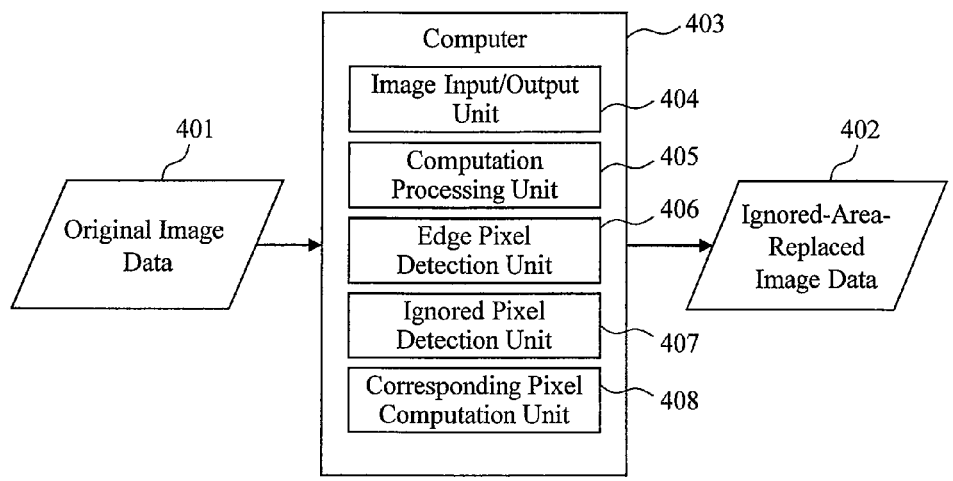

FIG. 4A is a functional block diagram showing an exemplary system configuration related to a process of replacing an ignored area with data having no influence on an analysis process that uses a two-dimensional wavelet transformation or the like. Hereinafter, description will be made on the assumption that the original image data (401) has the same number of pixels in the x direction and the y direction as that of ignored-area-replaced image data (402). A computer (e.g., CPU: 403) for performing processes includes an image input/output unit (404) for inputting and outputting image data, a computation processing unit (405) for performing a computation process, an edge pixel detection unit (406) for detecting edge pixels from the image data, an ignored pixel detection unit (407) for detecting ignored pixels from the image data, and a corresponding pixel computation unit (408) for computing the coordinates of an alternate pixel for each ignored pixel value and computing the value of the alternate pixel. Each of such functional units typically functions upon execution of a stored program with the CPU. Such processes correspond to a process of transforming the original image data (401), which is the image (101) containing the ignored area in FIG. 3, into the intermediate image (304) having no influence on analysis in FIG. 3. Such a process can, by providing the ignored area with pixels in the image data range 102 such that the pixels are folded at the edge pixels as the boundaries like a mirror, make the edge portions less noticeable, and thus suppress the influence of the edge processing on the image processing.

Figure 4B:
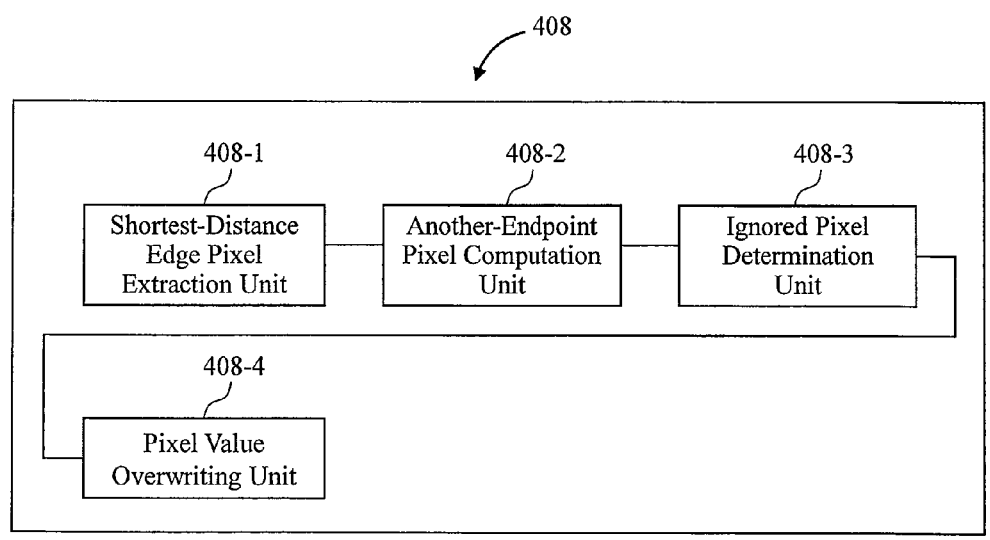
FIG. 4B is a functional block diagram showing an exemplary configuration of a corresponding pixel computation unit.

FIG. 4B is a functional block diagram showing an exemplary configuration of the corresponding pixel computation unit (408). The corresponding pixel computation unit (408) includes a shortest-distance edge pixel extraction unit 408-1, an another-endpoint pixel computation unit 408-2, an ignored pixel determination unit 408-3, and a pixel value overwriting unit 408-4.

Figure 5:
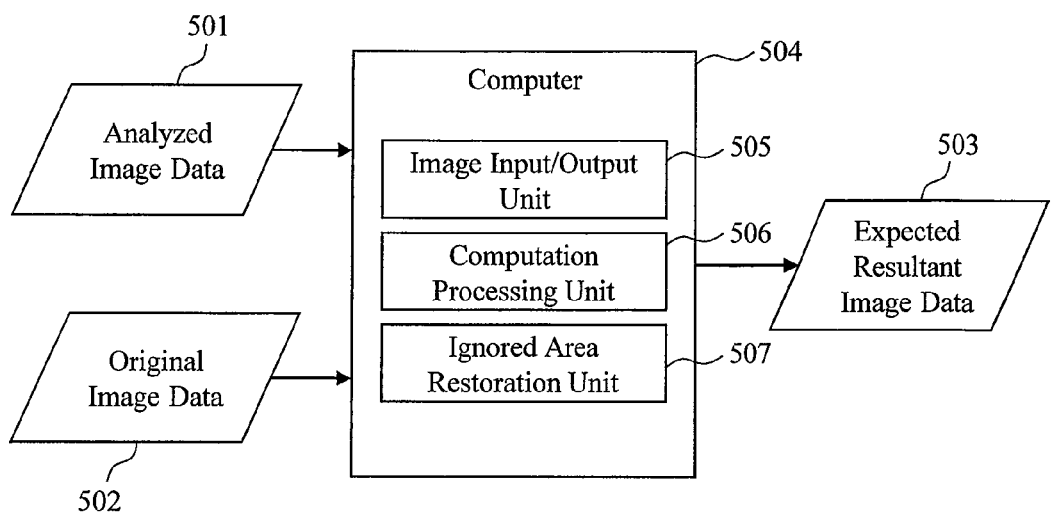
FIG. 5 is a functional block diagram showing an exemplary system configuration related to a process of reflecting an ignored area in the original image into an image that has been subjected to an analysis process that uses a two-dimensional wavelet transformation or the like, and image processing.

FIG. 5 is a functional block diagram showing an exemplary system configuration related to a process of reflecting the ignored area in the original image (101) into the intermediate image processing result (306) that has been subjected to an analysis process that uses a two-dimensional wavelet transformation or the like, and image processing. Herein, the analyzed image data (501) that has been subjected to an analysis process and image processing, original image data (502), and expected resultant image data (503) have the same number of pixels in the x direction and the y direction. The computer (504) for performing processes includes an image input/output unit (505) for inputting/outputting image data, a computation processing unit (506), and an ignored area restoration unit (507) for restoring the ignored area for the analyzed data. Such a process corresponds to a process of, assuming that the intermediate image processing result (306) in FIG. 3 is the analyzed image data (501), and the image (301) containing the ignored area in FIG. 3 is the original image data (502), transforming the image into the expected resultant image (303) in FIG. 3.

Figure 6:
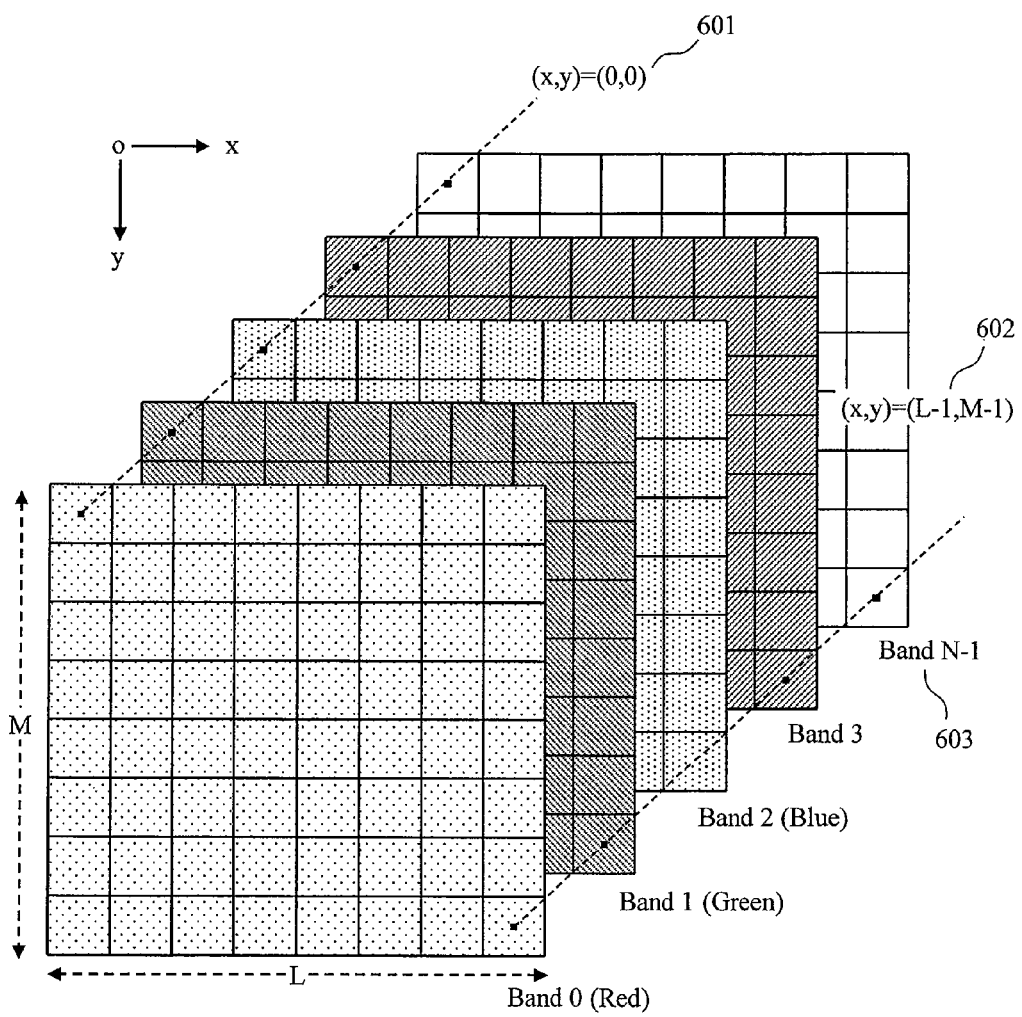
FIG. 6 is a conceptual diagram of image data used for image processing in accordance with this embodiment.

FIG. 6 is a diagram showing an exemplary data structure of an image data array. The image data has a structure in which pixels are arranged on the xy orthogonal plane. Herein, the origin of the xy plane indicates the upper left of the image, and the pixel coordinates of the origin are represented by $(x,y)=(0,0)$ (601). In addition, provided that the length of the image data in the x direction is L and the length of the image data in the y direction is M, the pixel coordinates of the lower right corner of the image are represented by $(x,y)=(L-1,M-1)$ (602). For each pixel, pixel values corresponding to the number of bands are stored. In the case of a typical digital camera, each pixel has three pixel values for red, green, and blue, or four values for red, green, blue, and alpha. In the case of a multi-spectral sensor for a satellite image or a specific aerial photograph, each pixel may have four or more pixel values. Thus, herein, pixel values of an image that has N bands are represented by band 0, band 1, and band N−1 (603).

FIG. 7 is a diagram showing an exemplary data structure of an image data array. Herein, one pixel is handled as one record. The column of the pixel ID (701) indicates the main key, and is computed as (the column of x)+(the column of y)×(image data length L in the x direction). Thus, although a composite key of x and y may be used as the main key, the key is defined herein by taking into consideration the computation cost for referencing data. The column of x (702) indicates the coordinate value in the x direction of the image plane, and the column of y (703) indicates the coordinate value in the y direction of the image plane. When the structure in FIG. 6 is reflected into FIG. 7, the column of the pixel ID (701) has a value of 0 to L×M−1, the column of x (702) has a value of 0 to L−1, and the column of y (703) has a value of 0 to M−1. In the column of each of the band 1 to the band N (704), the value of a pixel value for each band is stored. The range of values slightly differs depending on the image format, but in the case of image data of a typical digital camera, the value is 0 to 255, while in the case of some of satellite image data, the value is a floating point. In the present specification and FIG. 7, the value is assumed to be 0 to 255 for purposes of description.

FIG. 8 is a diagram showing an exemplary data structure of an edge pixel coordinate list. One record in the edge pixel coordinate list represents the coordinates of an edge pixel in the image data array. The column of the list ID (801) has, provided that the number of edge pixels is E, a value of zero to E−1. The column of x (802) indicates the coordinate value in the x direction of the image plane, and the column of y (803) indicates the coordinate value in the y direction of the image plane. The column of the pixel ID (804) indicates an external key of the pixel ID (701) in FIG. 7, and thus is unique. There is no overlap of the pixel ID in the edge pixel coordinate list. Accordingly, it is possible to uniquely designate a record in the image data array in FIG. 7 using a composite key of x and y. However, it is also possible to designate a record using the pixel ID that requires no computation cost.

Figure 9:
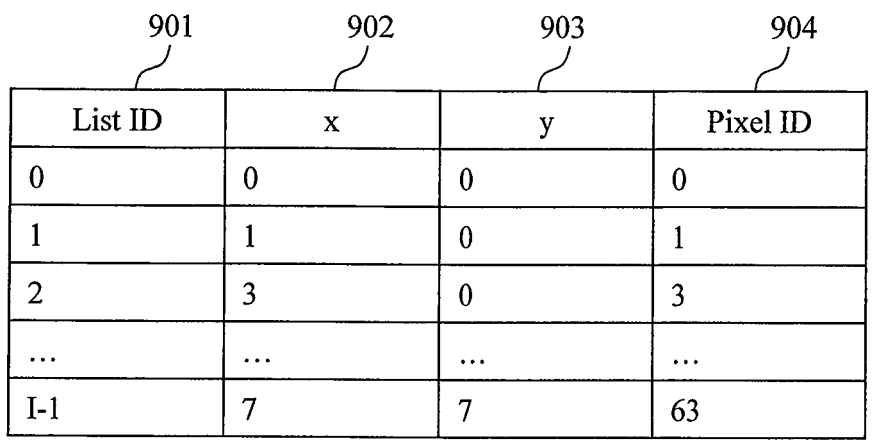
FIG. 9 is a diagram showing an exemplary data structure of an ignored pixel coordinate list.

FIG. 9 is a diagram showing an exemplary data structure of an ignored pixel coordinate list. One record in the ignored pixel coordinate list represents the coordinates of an ignored pixel in the image data array. The column of the list ID (901) has, provided that the number of ignored pixels is I, a value of 0 to I−1. The column of x (902) indicates the coordinate value in the x direction of the image plane, and the column of y (902) indicates the coordinate value in the y direction of the image plane. The column of the pixel ID (904) is an external key of the pixel ID (701) in FIG. 7, and thus is unique. There is no overlap of the pixel ID in the ignored pixel coordinate list. Accordingly, it is possible to uniquely designate a record in the image data array in FIG. 7 using a composite key of x and y. However, it is also possible to designate a record using the pixel ID that requires no computation cost.

Figure 10:
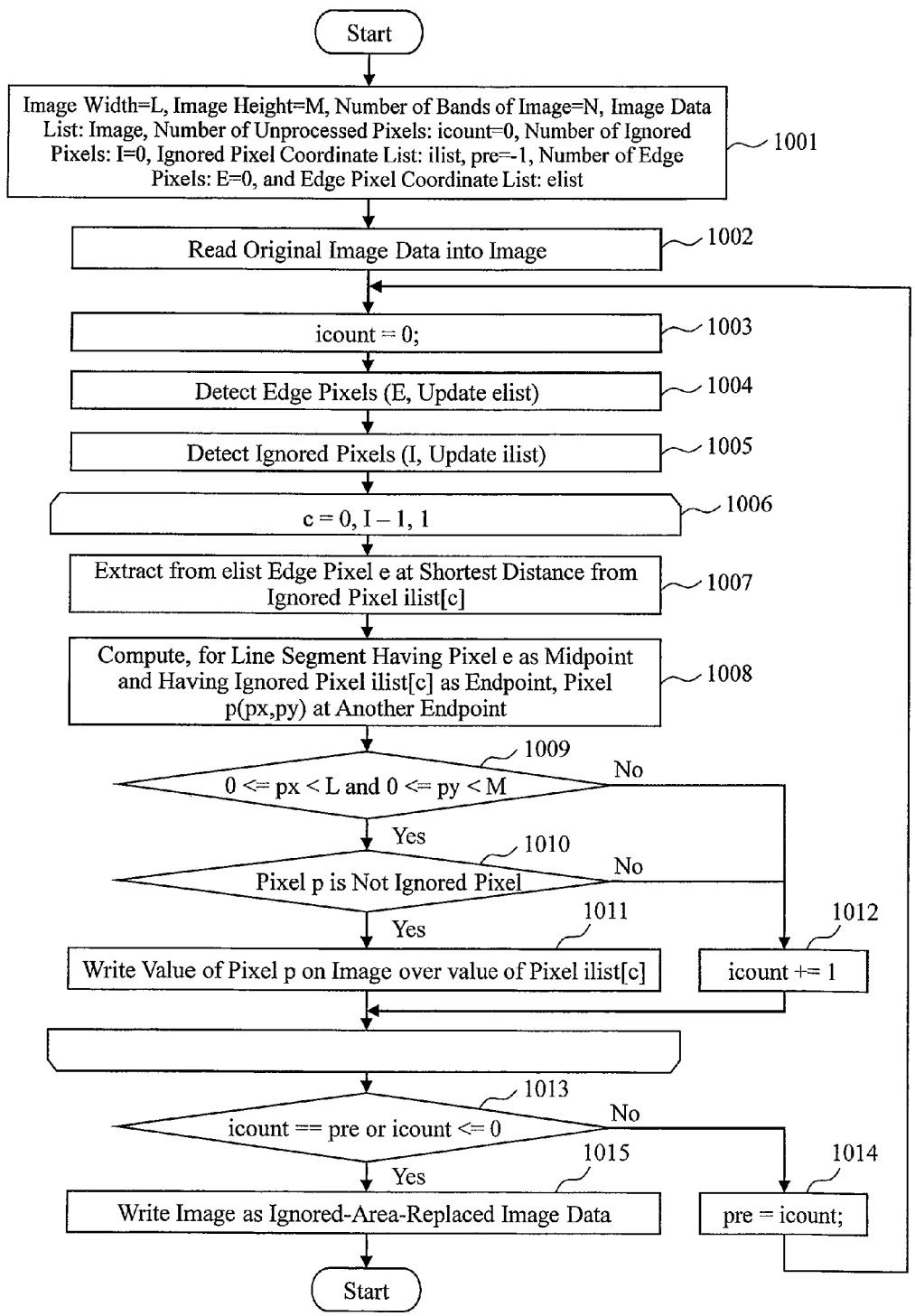
FIG. 10 is a flowchart diagram showing a summary of a process of replacing ignored area data with data having no influence on image analysis.

FIG. 10 is a flowchart diagram showing a summary of a process of replacing ignored area data with data having no influence on image analysis. The process shown in the flowchart diagram is mainly performed on the computation processing unit (405) of the computer (403) shown in FIG. 4A. This process corresponds to a process of transforming the image (101) containing the ignored area in FIG. 3, which is the original image data, into the intermediate image (304) having no influence on analysis in FIG. 3. Hereinafter, description will be made with reference to FIGS. 4A and 4B as appropriate.

First, the image width, which is the number of pixels in the x direction, of the original image is defined as L; the image height, which is the number of pixels in the y direction, of the original image is defined as M; the number of bands of the original image is defined as N; the image data list is defined as Image; the number of unprocessed pixels is defined as icount; the number of ignored pixels is defined as I; the ignored pixel coordinate list is defined as ilist; a variable is defined as pre; the number of edge pixels is defined as E; and the edge pixel coordinate list is defined as elist. Symbols L, M, and N correspond to those in FIG. 6. The image data list Image has the data structure shown in FIG. 7. First, zero is substituted into each of the number of unprocessed pixels icount, the number of ignored pixels I, and the number of edge pixels. −1 is substituted into the variable pre. The ignored image list ilist has the structure in FIG. 8, and a record therein is designated using the list ID as the main key. The edge pixel coordinate list elist has the structure in FIG. 9, and a record therein is designated using the list ID as the main key (step 1001). Next, with the image input/output unit (404), original image data with the structure in FIG. 6 is read into Image (step 1002). Next, zero is substituted into icount (step 1003). Next, with the edge pixel detection unit (406), image is operated in ascending order to detect edge pixels. The number of the detected edge pixels is substituted into E, and then, x, y, and the pixel ID of each edge pixel are registered in elist. Before the detection, the number of records in elist is initialized to zero. As a specific method for detecting edge pixels, if any of eight pixels around a determination target pixel is determined to be an ignored pixel as a result of scanning Image, the determination target pixel is determined to be an edge pixel. Then, x, y, and the pixel ID of the determination target pixel are registered as a new record in elist. Herein, the ignored pixel is a pixel whose pixel values for all bands are zero, but other values or combinations may also be used (step 1004). Next, with the ignored pixel detection unit (407), ignored pixels are detected, and the number of the detected ignored pixels are substituted into I. Then, x, y, and the pixel ID of each ignored pixel are registered in ilist. Before the detection, the number of records in ilist is initialized to zero. As a specific method for detecting ignored pixels, if a determination target pixel is determined to be an ignored pixel defined as above as a result of scanning Image, the determination target pixel is set as the ignored pixel, so that x, y, and the pixel ID of the determination target pixel are registered as a new record in ilist (step 1005). Next, the variable c is defined, and the following processes are repeated I times from zero to of I−1 (step 1006). During the repetition, the shortest-distance edge pixel extraction unit (408-1) first compares the coordinates ilist[c] of a record whose list ID is the variable c in ilist with the coordinates of each pixel in elist, and selects an edge pixel e with the shortest distance. Herein, the distance between the two pixels is defined as $(ix-ex)\times(ix-ex)+(iy-ey)\times(iy-ey)$, where the x and y coordinates in ilist are represented by ix,iy and the x and y coordinates in elist are represented by ex,ey. Although the Euclidean distance may also be determined, it is not intended herein to accurately determine the distance, but it is intended to determine an edge pixel with the shortest distance. Thus, the process is performed without a computation cost for the square root (step 1007). Next, during the repetition, the ignored pixel determination unit (408-3) and the another-endpoint pixel computation unit (408-2) of the corresponding pixel computation unit (408) determine, with respect to a line segment that has a pixel e at another endpoint as the midpoint and has the ignored pixel ilist[c] as an endpoint, a pixel p at another endpoint. Provided that the x and y coordinates of ilist[c] are cx,cy and the x and y coordinates of the pixel e are ex,ey, the coordinates of the pixel p are represented by ex+(ex−cx),ey+(ey−cy) (step 1008). Next, whether the coordinates of the pixel p are within the valid range is confirmed. The determination conditions herein are that the x coordinate px of the pixel p should be greater than or equal to zero and less than L and that the y coordinate py of the pixel p should be greater than or equal to zero and less than M (step 1009). If the determination conditions are false herein, 1 is added to icount, and the process returns to the start of the repeating process (step 1012). If the determination conditions are true herein, the ignored pixel determination unit (408-3) confirms if the pixel p is not an ignored pixel (step 1010). If the determination conditions are true herein, 1 is added to icount, and the process returns to the start of the repeating process (step 1012). If the determination conditions are false herein, the pixel value overwriting unit (408-4) writes the pixel values for all bands at the coordinates of the pixel p in the image data list Image over the pixel values for all bands at the coordinates of the pixel ilist[c]. Then, the process returns to the start of the repeating process (step 1011). Upon termination of the repeating process, it is determined if icount is equal to pre or if icount is less than or equal to zero (step 1013). If the result of determination in step 1013 is false, the value of pre is updated to icount, and the process returns back to the step of initializing icount immediately before the detection of an edge image to zero. In the first determination, pre takes a negative value. Thus, pre is not equal to icount that is always greater than or equal to zero. Thus, the process is always repeated twice or more (step 1014). If the result of determination in step 1013 is true, the image data list Image is written as the ignored-area-replaced image data, and the process is terminated (step 1015).

Figure 11:
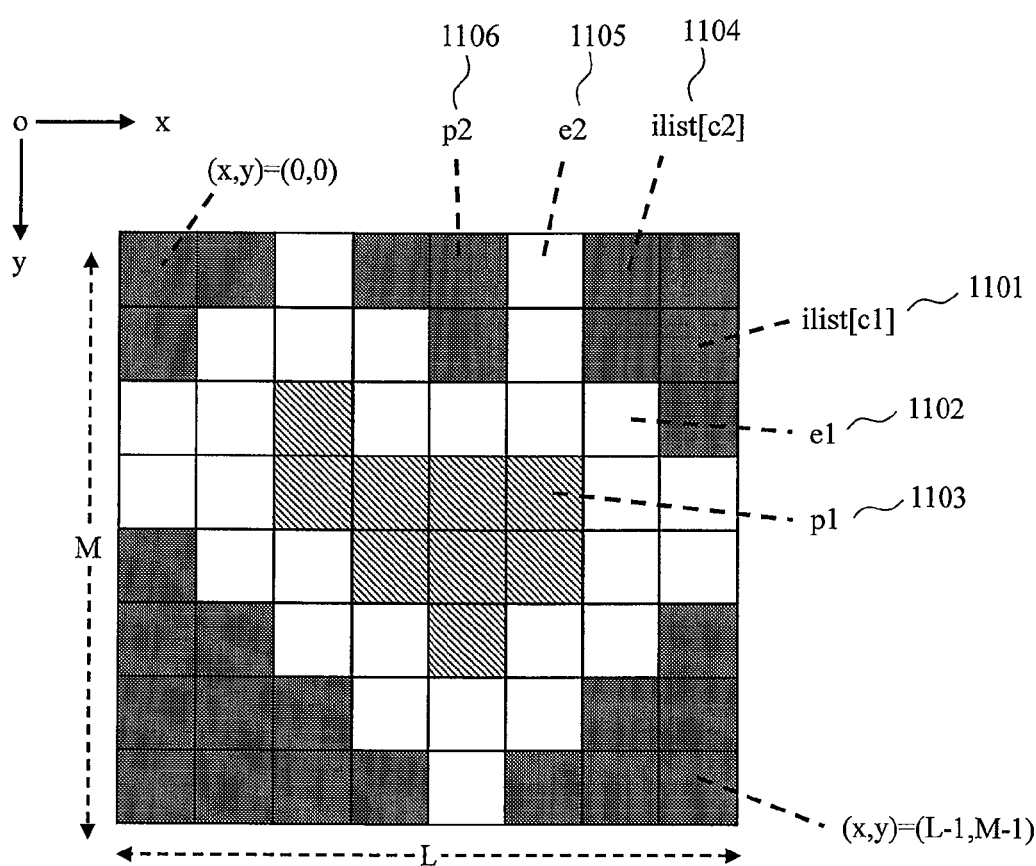
FIG. 11 is a schematic diagram of the coordinates of an ignored pixel, an edge pixel at the shortest distance from the ignored pixel, and a replacement pixel that is determined based on the ignored pixel and the edge pixel.

FIG. 11 is a diagram illustrating the coordinates of an ignored pixel, an edge pixel at the shortest distance from the ignored pixel, and a replacement (alternate) pixel that is determined based on the ignored pixel and the edge pixel. For example, in the case of an ignored pixel ilist[c1] (1101) whose valid list ID (0 to I−1) is a variable c1, an edge pixel at the shortest distance from the ignored pixel is e1 (1102). A pixel at the coordinates that correspond to, with respect to a line segment that has the edge pixel e1 (1102) as the midpoint and has ilist[c1] (1101) as an endpoint, the other endpoint of the line segment is p1 (1103). P1 (1103) is within the image data range, and is not an ignored pixel. Thus, the pixel value of the pixel p1 (1103) can be used as a substitute for the ignored pixel ilist[c1] (1101). Likewise, in the case of an ignored pixel ilist[c2] (1104) whose valid list ID (0 to I−1) is a variable c2, an edge pixel at the shortest distance from the ignored pixel is e2 (1105). A pixel at the coordinates that correspond to, with respect to a line segment that has the edge pixel e2 (1105) as the midpoint and has ilist[c2] (1104) as an endpoint, the other endpoint of the line segment is p2 (1106). Although p2 (1106) is within the image data range, it is the ignored pixel. Thus, p2 (1106) cannot be used as a substitute for the ignored pixel ilist[c2] (1104). This method has an advantage in that when the requested image data range (102) is a polygon that is formed by straight lines, an ignored area is formed such that the ignored area is line-symmetrical with respect to a side of the polygon.

Even when the requested image data range (102) has a complicated structure such as a curved line or an ellipse, the present invention can also be applied by forming an ignored area such that the ignored area is about line-symmetrical with respect to the curved line or the ellipse. When the ignored area is replaced with adjacent pixel values as described above, it becomes possible to ignore strong edges contained in the data image range and the ignored area, and the ignored area.

Although the above example illustrates a case where a replacement (alternate) pixel is extracted from an image data area that is symmetrical with respect to an edge image so as to replace the ignored image, it is also possible to handle a plurality of images as blocks and perform replacement of pixels in units of blocks. Alternatively, it is also possible to store pixels for replacing the ignored area in a storage unit in advance.

A strong edge appears as high-frequency components in a two-dimensional wavelet transformation. Therefore, it has adverse effect on statistical results such as mean or variance of the high-frequency components. Meanwhile, with regard to an ignored area that has the same pixel value, high-frequency components do not appear at all in a two-dimensional wavelet transformation. Therefore, a meaningless population adversely affects statistical results such as mean or variance. However, as alternate information for the ignored area is intended to, when spatial analysis is performed, prevent the ignored area from influencing statistical results such as mean or variance of pixel values, the alternate information is not the real image data. Thus, in order to obtain the expected resultant image data to be finally output, it is necessary to restore the ignored area as follows.

Figure 12:
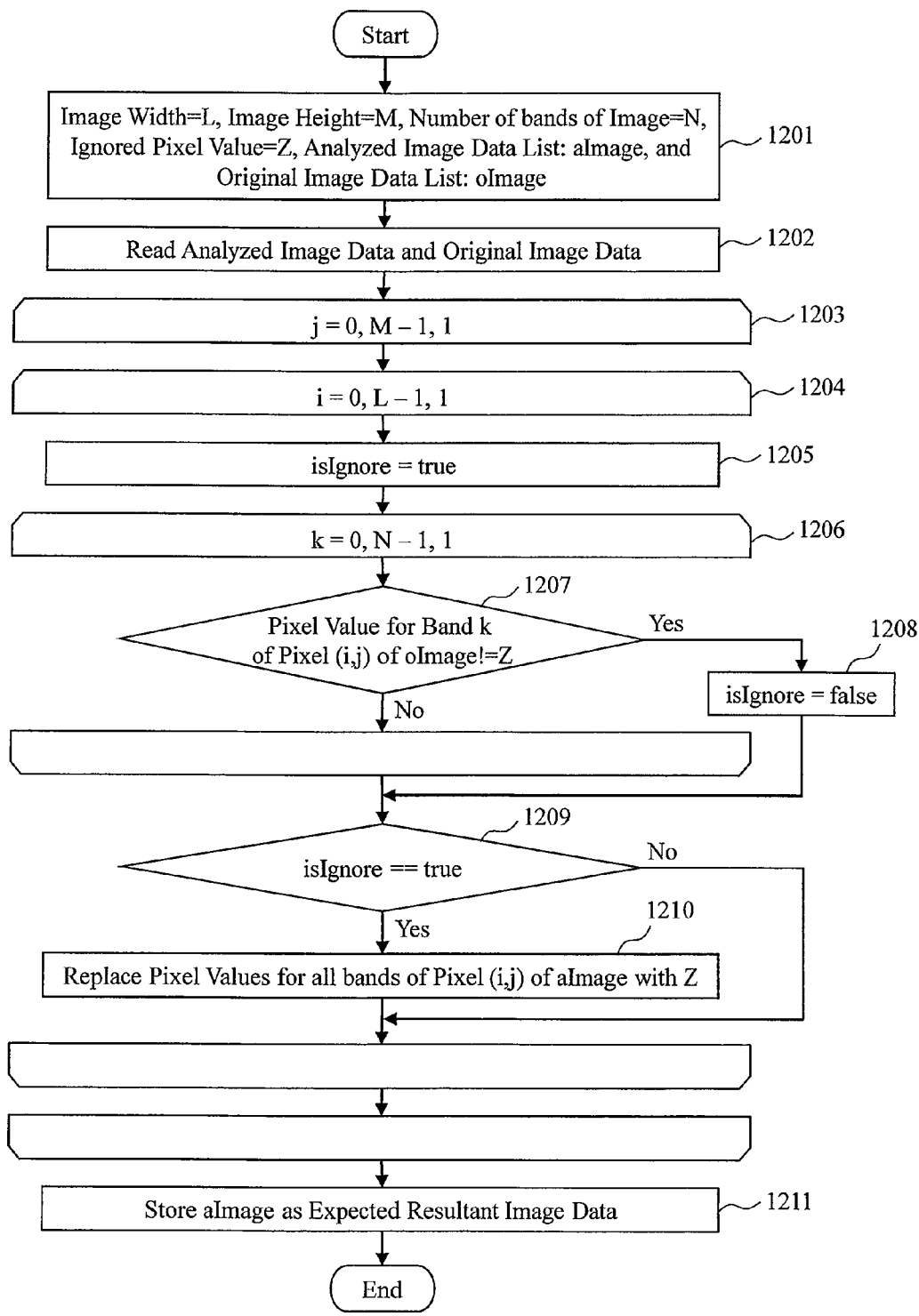
FIG. 12 is a flowchart diagram showing a summary of a process of reflecting an ignored area in the original image into an image that has been subjected to an analysis process that uses a two-dimensional wavelet transformation or the like, and image processing.

FIG. 12 is a flowchart showing a summary of a process of reflecting an ignored area in the original image into an image that has been subjected to an analysis process that uses a two-dimensional wavelet transformation or the like, and image processing. This flowchart is mainly processed on the computation processing unit (506) of the computer (504) in FIG. 5. It is assumed that the intermediate image processing result (306) in FIG. 3 is the analyzed image data (501) in FIG. 5, the image (301) containing the ignored area in FIG. 3 is the original image data (502), and the expected resultant image (303) in FIG. 3 is the expected resultant image data (503) in FIG. 5. First, the image width, which is the number of pixels in the x direction, of the original image is defined as L; the image height, which is the number of pixels in the y direction, of the original image is defined as M; the number of bands of the original image is defined as N; the analyzed image data list is defined as aImage; the original image data list is defined as oImage; and the ignored pixel value is defined as Z. Symbols L, M, and N correspond to those in FIG. 6. The analyzed image data list aImage and the original image data list oImage have the data structure shown in FIG. 7. Although the ignored pixel value Z herein is zero, it is acceptable as long as the ignored pixel value Z is different from values other than the ignored pixel value (step 1201). Next, the analyzed image data with the structure in FIG. 6 is read into aImage. Likewise, the original image data with the structure in FIG. 6 is read into oImage (step 1202). Next, in order to scan all pixels in the image data list, loop counters j (step 1203) and i (step 1204) in the x and y directions are defined. During the two repetitions, the following process is performed. In the repeating process, true is first substituted into the ignored pixel flag isIgnore (step 1205). Next, with regard to oImage, a pixel value at the coordinates designated by the loop counters i and j is determined. A loop counter k for bands is defined (step 1206), and it is confirmed whether the pixel value of the designated pixel for each band is the ignored pixel value Z (step 1207). If the pixel value of the designated pixel for any of the bands is not the ignored pixel value Z, the designated pixel can be determined to be not the ignored pixel. Thus, false is substituted into isIgnore. If the pixel values of the designated pixel for all bands are Z, isIgnore remains true (step S1208). Next, isIgnore is judged (step 1209). If the result of judgment in step 1209 is false, the next pixel is judged. If the result of judgment in step 1209 is true, the ignored area restoration unit (507) replaces the pixel values for all bands of the record at the i,j coordinates of aImage with Z (step 1210). Such repetition is applied to all pixels, and the updated aImage is stored as the expected resultant image data in FIG. 5 (1211). As described above, alternate information that has been temporarily used for replacement purposes for spatial analysis is restored to the original ignored area.

As described above, according to the present embodiment, it is possible to, when image data containing an ignored area is analyzed, prevent the ignored area from influencing the analysis, and avoid complexity of the process.

Configurations and the like of the above embodiment shown in the attached drawings are not limited thereto, and may be changed as appropriate within the range that the advantageous effects of the present invention can be exerted. Besides, other changes may also be made as appropriate within the range that the object of the present invention can be achieved. Further, each component of the present invention may be selected or not selected as appropriate, and an invention that has the selected or non-selected configurations is also included in the present invention.

The present invention may also be a program for causing a computer to execute an image processing method, or a computer-readable recording medium having the program recorded thereon.

INDUSTRIAL APPLICABILITY

The present invention can be applied to an image processing device.

REFERENCE SIGNS LIST

101 Image data
102 Requested image data range
103 Ignored area
201 High-frequency components of both x and y components that are orthogonal to the original image are HH1
202 High-frequency components in the x direction of the original image and low-frequency components in the y direction of the original image are HL1
203 Low-frequency components in the x direction of the original image and high-frequency components in the y direction of the original image are LH1
204 Low-frequency components of both the x and y components that are orthogonal to the original image are decomposed into high-frequency components of both the x and y components: HH2
205 Low-frequency components of both the x and y components that are orthogonal to the original image are decomposed into high-frequency components in the x direction and low-frequency components in the y direction: HL2
206 Low-frequency components of both the x and y components that are orthogonal to the original image are decomposed into low-frequency components in the x direction and high-frequency components in the y direction: LH2
207 Low-frequency components of both the x and y components that are orthogonal to the original image are decomposed into low-frequency components of both the x and y components: LL2
302 Analysis in which the ignored area is taken into consideration
303 Expected resultant image
304 Intermediate image having no influence on analysis
305 Analysis in which the ignored area is not taken into consideration
306 Intermediate image processing result for which the ignored area is not taken into consideration
401 Original image data
402 Ignored-area-replaced image data
403 Computer for executing processes
404 Image input/output unit
405 Computation processing unit
406 Edge pixel detection unit
407 Ignored pixel detection unit
408 Corresponding pixel computation unit
501 Analyzed image data
502 Original image data
503 Expected resultant image data
504 Computer
505 Image input/output unit
506 Computer processing unit
507 Ignored area restoration unit
601 Pixel coordinates of the origin
602 Pixel coordinates of the lower right corner of an image
603 Description of the pixel value of the designated pixel for each band
701 Column of the pixel ID
702 Column of x
703 Column of y
704 Columns of Band 1 to Band N
801 Column of the list ID
802 Column of x
803 Column of y
804 Column of the pixel ID
901 Column of the list ID
902 Column of x
903 Column of y
904 Column of the pixel ID
1001 Initialization of a variable
1002 Reading of the original image data
1003 Initialization of the number of unprocessed ignored pixels
1004 Detection of edge pixels
1005 Detection of ignored pixels
1006 Repeating process on the ignored pixel list
1007 Extraction of an edge pixel with the shortest distance
1008 Computation of the coordinates of a pixel at another endpoint
1009 Determination of the range of a valid image
1010 Determination of the ignored pixel
1011 Replacement with an alternate pixel value
1012 Increment the number of unprocessed ignored pixels
1013 Determination of whether to repeat the process
1014 Update of a variable for determining whether to repeat the process
1015 Writing as ignored-area-replaced image data
1101 Ignored pixel ilist[c1]
1102 Edge pixel e1
1103 Alternate pixel p1
1104 Ignored pixel ilist[c2]
1105 Edge pixel e2
1106 Alternate pixel p2
1201 Initialization of a variable
1202 Reading of analyzed image data/original image data
1203 Coordinate counter in the y direction of the image data
1204 Coordinate counter in the x direction of the image data
1205 Initialization of an ignored pixel flag
1206 Counter of index of band for image data
1207 Judgment of an ignored pixel value
1208 Update of the ignored pixel flag
1209 Judgment of the ignored pixel flag

1210 Update of pixel values of the designated pixel for all bands to the ignored pixel value

1211 Writing as the expected resultant image data

All publications, patents, and patent applications cited in the present specification are incorporated by reference into the present specification.

The invention claimed is:

1. An image processing device comprising:
   a computer coupled to a processing unit and a corresponding pixel computation unit programmed to, with respect to image data containing an image data area and an ignored area, execute a process of replacing a pixel in the ignored area having influence on a spatial analysis process with a pixel having no influence on the spatial analysis process, thereby converting the image data into an intermediate image,
   wherein the corresponding pixel computation unit includes:
   a shortest-distance edge pixel extraction unit programmed to extract an edge pixel at a shortest distance from the ignored pixel;
   an another-endpoint pixel computation unit programmed to compute, with respect to a line segment having the edge pixel as a midpoint and having the ignored pixel as an endpoint, a pixel at another endpoint;
   an ignored pixel determination unit programmed to determine if the pixel at the other endpoint is an ignored pixel; and
   a pixel value overwriting unit programmed to, if the pixel at the other endpoint is not an ignored pixel, write a pixel value of the pixel at the other endpoint over the pixel value of the ignored pixel,
   wherein the process includes execution by each of the shortest-distance edge pixel extraction unit, the another-endpoint pixel computation unit, the ignored pixel determination unit, and the pixel value overwriting unit at least twice, and
   wherein the processing unit is programmed to perform a process of reflecting the ignored area in the image, which contains the ignored area, into an intermediate image processing result for which the ignored area is not taken into consideration.

2. The image processing device according to claim 1, wherein the processing unit obtains the intermediate image processing result by sequentially subjecting the intermediate image to a two-dimensional wavelet transformation process, analysis in which the ignored area is not taken into consideration, and a two-dimensional wavelet inverse transformation process by not taking the ignored area into consideration.

3. The image processing device according to claim 1, wherein the corresponding pixel computation unit computes coordinates of an alternate pixel for each ignored pixel value and a value of the alternate pixel on the basis of a pixel in the image data area that is symmetrical with respect to an edge pixel at a boundary between the image data area and the ignored area.

4. The image processing device according to claim 1, wherein an image, which has been obtained by applying a spatial analysis process to an image obtained by replacing the ignored area with alternate information, is restored to the original ignored area.

5. An image processing method comprising:
   a corresponding pixel computation step of, with respect to image data containing an image data area and an ignored area, replacing a pixel in the ignored area having influence on a spatial analysis process with a pixel having no influence on the spatial analysis process, thereby converting the image data into an intermediate image; and
   a processing step of performing a process of reflecting the ignored area in the image, which contains the ignored area, into an intermediate image processing result for which the ignored area is not taken into consideration,
   wherein the corresponding pixel computation step includes the steps of:
   extracting an edge pixel at a shortest distance from the ignored pixel;
   computing, with respect to a line segment having the edge pixel as a midpoint and having the ignored pixel as an endpoint, a pixel at another endpoint;
   determining if the pixel at the other endpoint is an ignored pixel; and
   writing a pixel value of the pixel at the other endpoint over the pixel value of the ignored pixel, if the pixel at the other endpoint is not an ignored pixel,
   wherein the steps of the corresponding pixel computation step are performed at least twice.

6. The image processing method according to claim 5, wherein the processing step includes obtaining the intermediate image processing result by sequentially subjecting the intermediate image to a two-dimensional wavelet transformation process, analysis in which the ignored area is not taken into consideration, and a two-dimensional wavelet inverse transformation process, by not taking the ignored area into consideration.

7. The image processing method according to claim 5, wherein the corresponding pixel computation step includes computing coordinates of an alternate pixel for each ignored pixel value and a value of the alternate pixel on the basis of a pixel in the image data area that is symmetrical with respect to the edge.

8. The image processing method according to claim 5, further comprising restoring an image, which has been obtained by applying a spatial analysis process to an image obtained by replacing an ignored area with alternate information, to the original ignored area.

9. A non-transitory computer-readable storage medium having stored thereon a program for causing a computer to execute the image processing method according to claim 5.

\* \* \* \* \*